United States Patent [19]

Evans et al.

[11] Patent Number: 4,973,822
[45] Date of Patent: Nov. 27, 1990

[54] GAS METAL ARC WELDING AND SHIELDING GAS THEREFOR

[75] Inventors: James R. Evans, Poughkeepsie, N.Y.; Earl D. Colvin, Nuevo, Calif.

[73] Assignee: Union Carbide Industrial Gases Technology Corporation, Wilmington, Del.

[21] Appl. No.: 480,112

[22] Filed: Feb. 14, 1990

[51] Int. Cl.$^5$ .............................................. B23K 9/173
[52] U.S. Cl. .................................... 219/137 PS; 219/74
[58] Field of Search ................... 219/137 PS, 74, 136

[56] References Cited

U.S. PATENT DOCUMENTS

| | | | |
|---|---|---|---|
| 3,139,508 | 6/1964 | Freeman et al. | 219/74 |
| 3,185,812 | 5/1965 | Richter et al. | 219/74 |
| 3,496,323 | 2/1970 | Lesnewich et al. | 219/74 |
| 4,463,243 | 7/1984 | Church | 219/74 |
| 4,529,863 | 7/1985 | Lebel | 219/137.42 |
| 4,626,646 | 12/1986 | Hilton | 219/74 |
| 4,645,903 | 2/1987 | Devito et al. | 219/137 R |
| 4,749,841 | 6/1988 | Galantino et al. | 219/137 PS |
| 4,857,692 | 8/1989 | Larson et al. | 219/74 |
| 4,871,898 | 10/1989 | Cherne et al. | 219/137 R |
| 4,902,866 | 2/1990 | Galantino | 219/74 |

FOREIGN PATENT DOCUMENTS 1089027 11/1980 Canada .
448106 4/1975 U.S.S.R. .

Primary Examiner—Clifford C. Shaw
Attorney, Agent, or Firm—Stanley Ktorides

[57] ABSTRACT

A welding method and shielding gas therefor which enables the use of gas metal arc welding to produce smooth welds with little or no surface oxidation and without encountering arc instability during the metal deposition.

17 Claims, 1 Drawing Sheet

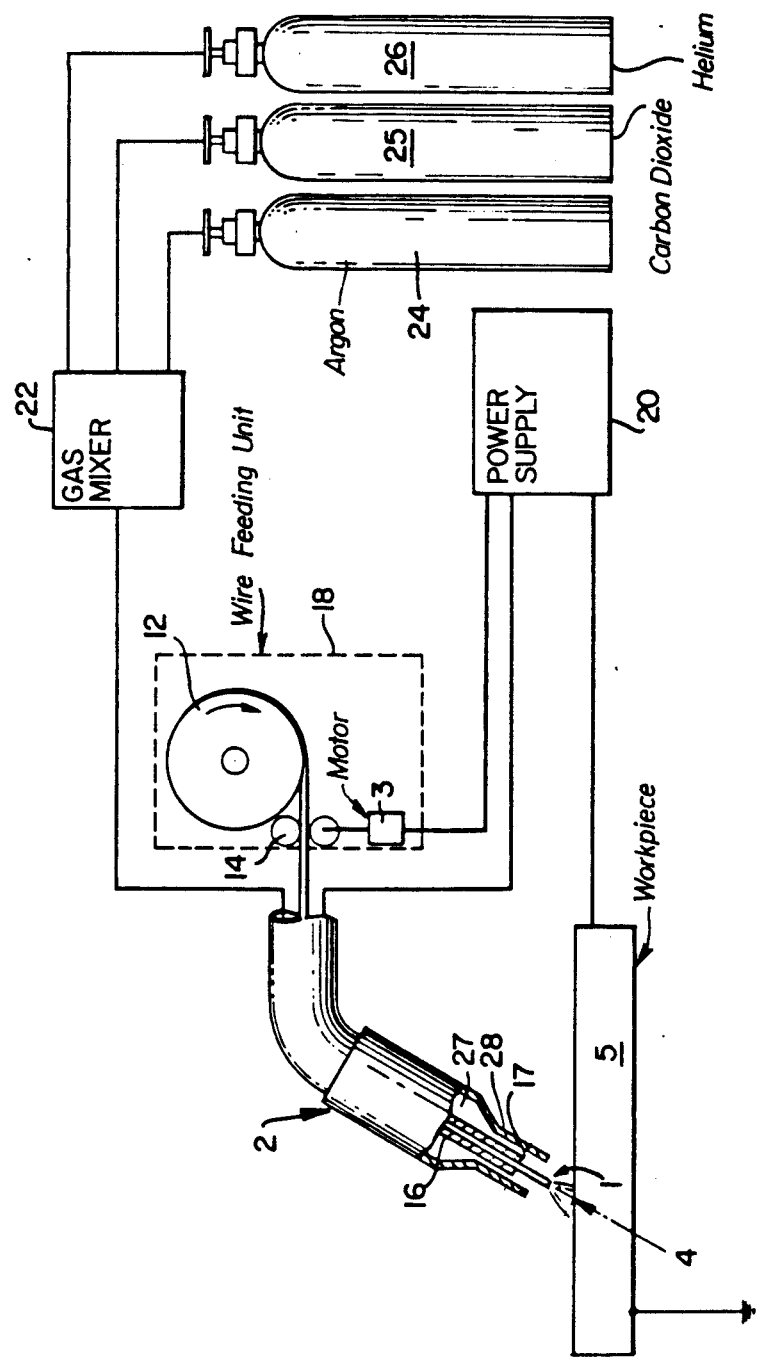

GAS METAL ARC WELDING AND SHIELDING GAS THEREFOR

TECHNICAL FIELD

This invention relates generally to gas metal arc welding and, more particularly, is an improved process for gas metal arc welding which can significantly improve the appearance of welds on stainless steel and on non-ferrous metal.

BACKGROUND ART

Gas metal arc welding, commonly referred to as "GMAW" or "MIG" welding, is an electric arc welding process in which the arc is shielded from the ambient atmosphere by a gas or a mixture of gases. Metal is transferred to a workpiece through the arc from a consumable wire electrode. The consumable wire electrode is continuously fed into the arc at a preselected speed corresponding to a given deposition rate for a given wire size.

There are several different modes of metal transfer which are used with gas metal arc welding. The short circuit transfer mode is a gas metal arc welding process wherein the consumable wire electrode is deposited during repeated short circuits. In the globular transfer mode, molten metal is transferred in large drops from the consumable electrode across the arc. The spray transfer mode involves metal transfer in which molten metal from the consumable electrode is propelled axially across the arc in small drops. The pulsed spray transfer mode is an arc welding process variation wherein the current is pulsed to utilize the advantages of the spray mode of metal transfer at average currents equal to or less than the globular to spray transition current.

Gas metal arc welding is becoming a preferred type of welding because the continuously fed electrode enables the attainment of a greater metal transfer rate over that attainable with totally manual welding methods as well as attaining a greater operator duty cycle.

In some welding applications the appearance of the weld is of prime importance. Such applications include the welding of articles made of stainless steel which generally require a polished appearance. In addition, for a welded article which undergoes sterilizing or cleaning, a smooth weld surface is required to facilitate such sterilizing or cleaning. Heretofore it has generally been necessary to employ gas tungsten arc welding in order to achieve the requisite appearance for welds on metal used for applications which require a very smooth surface. This method is costlier than gas metal arc welding due to the increased labor cost and the slower metal deposition rate inherent in this method.

Accordingly it is an object of this invention to provide a gas metal arc welding method which produces a weld having an appearance comparable to that attainable with gas tungsten arc welding at a higher weld deposition rate.

It is another object of this invention to provide a shielding gas mixture for gas metal arc welding which enables the attainment of welds having an improved appearance over welds attainable with known shielding gas mixtures.

SUMMARY OF THE INVENTION

The above and other objects which will become apparent to one skilled in the art upon a reading of this disclosure are attained by the present invention one aspect of which is:

A method for gas metal arc welding with a consumable wire electrode comprising:
 (a) forming an arc between said consumable wire electrode and a workpiece;
 (b) maintaining a substantially constant arc voltage between said wire electrode and the workpiece;
 (c) feeding the consumable wire electrode through a welding torch contact tube into said arc;
 (d) transferring metal from the electrode to the workpiece; and
 (e) shielding the arc with a gas mixture consisting essentially of:
 (A) from 0.5 to 1.25 volume percent carbon dioxide;
 (B) from 30 to 40 volume percent helium; and
 (C) the balance argon.

Another aspect of this invention is:

A shielding gas mixture for use with gas metal arc welding consisting essentially of:
 (A) from 0.5 to 1.25 volume percent carbon dioxide;
 (B) from 30 to 40 volume percent helium; and
 (C) the balance argon As used herein, the term "stainless steel" means a steel from a group of highly alloyed materials, primarily alloys of iron and chromium where the chromium content may be in the range of from 10 to 30 percent. Other alloying elements such as nickel within the range of from 1 to 22 percent and manganese within the range of from 0.5 to 10 percent may also be included.

As used herein, the term "non-ferrous metal" means a metal wherein iron is not a major component. Such metals include but are not limited to aluminum alloys, copper alloys, and high nickel and cobalt alloys.

As used herein the term "carbon steel" means an alloy of iron and carbon wherein the carbon concentration generally does not exceed 0.5 percent, wherein manganese may be present in a concentration generally not exceeding 1.65 percent, wherein copper and silicon may be present in concentrations not exceeding 0.6 percent, and other alloy elements are generally not present except in residual amounts.

BRIEF DESCRIPTION OF THE DRAWING

The sole FIGURE is a schematic diagram of one system useful for carrying out the process of this invention.

DETAILED DESCRIPTION

The invention will be described in detail with reference to the Drawing.

Referring now to the FIGURE, consumable wire electrode 1 is drawn from reel 12 by feed roll 14 through contact tube 16 in gas shielded arc welding torch 2. The consumable wire electrode may have a diameter within the range of from 0.023 to 0.052 inch and may be composed of any suitable metal composition appropriate for the particular welding application.

Any suitable gas shielded torch may be used to carry out the process of this invention. The torch may be either manually operated or mechanized. In the embodiment illustrated in the FIGURE, torch 2 is a mechanized torch. Feed roll 14 is driven by drive motor 3 contained in wire feeding unit 18 which can feed wire at the speeds necessary to achieve the desired deposition rates.

Power supply 20 supplies power to both wire feeding unit 18 and torch 2. Power supply 20 is voltage controlled and of the constant potential type.

In operation an arc 4 is established between consumble electrode 1 and workpiece 5 by energizing power supply 20 feeding the electrode into direct contact with the workpiece. The arc voltage between the electrode and the workpiece is kept substantially constant during the welding process. By "substantially constant" it is meant that the arc voltage varies not more than 5 percent from the set point during the welding process. The arc voltage setpoint is at a point where a stable arc can be achieved for whichever transfer mode is chosen. The method of this invention is particularly advantageous for use with the short circuiting transfer, spray transfer, and pulsed spray transfer modes of metal transfer. The substantially constant voltage allows for a self-regulating welding condition in that as the arc length varies during welding, the wire melt off rate also varies to keep the arc voltage substantially constant. This allows for stable welding conditions to be maintained with uniform weld penetration and bead shape. The arc voltage is generally within the range of from 17 to 40 volts. The consumable wire electrode is fed through welding torch contact tube 16 into the arc and metal is transferred from the electrode to the workpiece.

The electrode 1 is fed through the contact tube 16 into the arc 4 formed between the electrode 1 and workpiece 5. Contact tube 16 is connected through torch 2 to power supply 20 for supplying power to electrode 1. Workpiece 5 is connected to ground in common with the power supply ground.

The arc is shielded from the ambient atmosphere by a gas mixture consisting essentially of from 0.5 to 1.25 percent, preferably from 0.60 to 0.95 percent, most preferably from 0.75 to 0.90 percent, carbon dioxide, from 30 to 40 percent, preferably from 32 to 38 percent, most preferably from 32 to 34 percent helium, with the balance being argon. The percentages are in volume percent. A carbon dioxide concentration in the shielding gas lower than about 0.5 percent will lead to an unstable arc. A carbon dioxide concentration greater than about 1.25 percent will have a deleterious effect on the weld bead appearance. A helium concentration in the shielding gas outside the defined range will cause an increase in puddle fluidity causing control problems when welding in the vertical up or overhead positions or cause a restrictive operating window by raising the voltage required to maintain a stable arc thereby lowering weld appearance quality.

Referring back now to the FIGURE, the shielding gas mixture useful with this invention may be made up within gas mixer 22 which receives the component gases from cylinders 24, 25, and 26. For example cylinder 24 may contain argon, cylinder 25 may contain carbon dioxide and cylinder 26 may contain helium. Any other suitable gas storage container, such as a storage tank, may also be employed in conjunction with the invention. Gas mixer 22 can be any conventional gas mixer which can be set to meter the appropriate gas from each gas source to establish the gas mixture useful with the present invention. Alternatively the gas mixture of this invention may be supplied already mixed from a single container.

The shielding gas mixture useful with this invention is then passed through conduit means 6 to torch 2 and is passed through space 27 between contact tube 16 and torch cup 28 so that it forms a shroud for shielding arc 4 from the ambient atmosphere.

The gas metal arc welding method and shielding gas mixture of this invention enables the attainment of high quality welds with excellent appearance. This is particularly important in the welding of stainless steel where appearance is generally an important factor.

Surprisingly the gas metal arc welding method and shielding gas mixture of this invention has also enabled the attainment of high quality welds with reduced defects in the welding of non-ferrous metal such as copper-nickel alloys. Most shielding gas mixtures for welding non-ferrous metals are completely inert to prevent oxidation of the materials during the weld metal transfer. With the use of the invention the small defined percentage of carbon dioxide present improves the arc stability and puddle fluidity without significant deterioration in weld appearance or properties.

The gas metal arc welding method and shielding gas mixture of this invention achieves advantageous results without the need to employ hydrogen or oxygen as a shielding gas component. Hydrogen has been used in shielding gas mixtures as a reducing gas. Its high thermal conductivity provides a more fluid weld puddle allowing for higher welding travel speeds. The reducing effect hydrogen has on the shielding gas helps remove oxygen from the weld area and also improves weld appearance. However, hydrogen is undesirable because of its flammability and because it may attack the structural integrity of cylinders within which it is stored. Oxygen has been used in shielding gas mixtures in order to provide an oxidizing gas to the welding operation so as to better control the fluidity of the weld puddle. However, oxygen causes a large amount of metallic oxidation and small changes in the oxygen concentration can cause significant changes in weld composition and appearance. To provide the appropriate level of oxidation for use with this invention, the required oxygen range would be so narrow that it cannot be accurately controlled. The invention achieves the requisite level of oxidation by using the defined range of carbon dioxide which is more easily controlled than would the required range of oxygen. Moreover the defined composition of the shielding gas mixture of this invention enables the attainment of efficient welding with very low and controllable concentrations of carbon dioxide while avoiding arc instabilities.

The following examples serve to further illustrate the invention. The examples are presented for illustrative and comparative purposes and are not intended to be limiting.

EXAMPLE 1

The method of this invention was used to weld stainless steel tank liners. The spray mode of metal transfer was used and the shielding gas comprised 0.9 percent carbon dioxide, 33 percent helium with the balance argon. The weld bead appearance was improved and productivity was increased by 60 percent over that attainable when similar work was done using a welding shielding gas comprising 1 percent oxygen with the balance argon.

EXAMPLE 2

The method of this invention was used to weld copper-nickel pipe at a shipyard facility. The pulsed spray mode of metal transfer was used and the welding shielding gas comprised 0.9 percent carbon dioxide, 33 percent helium with the balance argon. With the use of the invention a much more stable and controllable arc was produced and weld bead appearance was improved over that attainable when similar work was done using a welding shielding gas comprising 100 percent argon.

Although the invention has been described in detail with reference to certain specific embodiments, those skilled in the art will recognize that there are other embodiments of the invention within the spirit the scope of the claims.

We claim:

1. A method for gas metal arc welding with a consumable wire electrode comprising:
    (a) forming an arc between said consumable wire electrode and a workpiece;
    (b) maintaining a substantially constant arc voltage between said wire electrode and the workpiece;
    (c) feeding the consumable wire electrode through a welding torch contact tube into said arc;
    (d) transferring metal from the electrode to the workpiece; and
    (e) shielding the arc with a gas mixture consisting essentially of:
        (A) from 0.5 to 1.25 volume percent carbon dioxide;
        (B) from 30 to 40 volume percent helium; and 2. The method of claim 1 wherein the carbon dioxide concentration is within the range of from 0.60 to 0.95 volume percent.

3. The method of claim 1 wherein the carbon dioxide concentration is within the range of from 0.75 to 0.90 volume percent.

4. The method of claim 1 wherein the helium concentration is within the range of from 32 to 38 volume percent.

5. The method of claim 1 wherein the helium concentration is within the range of from 32 to 34 volume percent.

6. The method of claim 1 wherein the electrode has a diameter within the range of from 0.023 to 0.052 inch.

7. The method of claim 1 wherein the arc voltage is within the range of from 17 to 40 volts.

8. The method of claim 1 wherein the workpiece is comprised of stainless steel.

9. The method of claim 1 wherein the workpiece is comprised of carbon steel.

10. The method of claim 1 wherein the workpiece is comprised of non-ferrous metal.

11. The method of claim 10 wherein the non-ferrous metal is a copper-nickel alloy.

12. The method of claim 10 wherein the non-ferrous metal is aluminum.

13. A shielding gas mixture for use with gas metal arc welding consisting essentially of:
    (A) from 0.5 to 0.95 volume percent carbon dioxide;
    (B) from 30 to 40 volume percent helium; and
    (C) the balance argon.

14. The shielding gas mixture of claim 13 wherein the carbon dioxide concentration is within the range of from 0.60 to 0.95 volume percent.

15. The shielding gas mixture of claim 13 wherein the carbon dioxide concentration is within the range of from 0.75 to 0.90 volume percent.

16. The shielding gas mixture of claim 13 wherein the helium concentration is within the range of from 32 to 38 volume percent.

17. The shielding gas mixture of claim 13 wherein the helium concentration is within the range of from 32 to 34 volume percent.

* * * * *

UNITED STATES PATENT AND TRADEMARK OFFICE
CERTIFICATE OF CORRECTION

PATENT NO. : 4,973,822

DATED : November 27, 1990

INVENTOR(S) : J. R. Evans et al

It is certified that error appears in the above-identified patent and that said Letters Patent is hereby corrected as shown below:

Column 5:

In claim 1, line 26 after "and" insert -- (C) the balance argon. --

Signed and Sealed this

Seventh Day of April, 1992

Attest:

HARRY F. MANBECK, JR.

*Attesting Officer*  *Commissioner of Patents and Trademarks*